(12) United States Patent
Gerstel et al.

(10) Patent No.: US 7,110,668 B2
(45) Date of Patent: Sep. 19, 2006

(54) OPTICAL NETWORK CONNECTION TEST APPARATUS AND METHODS

(75) Inventors: Ornan A. Gerstel, Los Altos, CA (US); Rajiv R. Ramaswami, Sunnyvale, CA (US); Robert R. Ward, St. Charles, IL (US)

(73) Assignee: Tellabs Operations, Inc., Naperville, IL (US)

( * ) Notice: Subject to any disclaimer, the term of this patent is extended or adjusted under 35 U.S.C. 154(b) by 0 days.

(21) Appl. No.: 10/784,972

(22) Filed: Feb. 25, 2004

(65) Prior Publication Data

US 2004/0165888 A1  Aug. 26, 2004

Related U.S. Application Data

(62) Division of application No. 09/332,046, filed on Jun. 14, 1999.

(60) Provisional application No. 60/112,506, filed on Dec. 14, 1998.

(51) Int. Cl.
*H04B 10/00* (2006.01)

(52) U.S. Cl. ............................ 398/5; 398/167; 398/30

(58) Field of Classification Search ................ 398/175, 398/60, 5, 177, 9–14, 2, 4, 30, 31, 32, 33, 398/167
See application file for complete search history.

(56) References Cited

U.S. PATENT DOCUMENTS

| | | | | |
|---|---|---|---|---|
| 4,300,239 A | 11/1981 | Wakabayashi et al. | ...... | 455/601 |
| 4,850,045 A | 7/1989 | Funke | ........................ | 455/607 |
| 4,887,309 A | 12/1989 | Andersson et al. | ......... | 455/601 |
| 5,060,224 A * | 10/1991 | Konishi | ........................ | 398/60 |
| 5,060,226 A | 10/1991 | Gewin et al. | ................ | 370/244 |
| 5,150,243 A | 9/1992 | Suzuki | ........................ | 359/110 |
| 5,212,713 A | 5/1993 | Frisch | ........................ | 375/3.1 |
| 5,265,096 A | 11/1993 | Parruck | .................... | 370/110.1 |
| 5,289,474 A | 2/1994 | Purcell et al. | ................ | 714/16 |
| 5,367,395 A | 11/1994 | Yajima et al. | ............. | 359/110 |
| 5,436,746 A | 7/1995 | Hirst | .......................... | 359/110 |
| 5,619,489 A | 4/1997 | Chang et al. | ................ | 370/241 |
| 5,717,795 A * | 2/1998 | Sharma et al. | ................ | 385/24 |
| 5,790,287 A | 8/1998 | Darcie et al. | ................ | 359/110 |
| 5,825,515 A | 10/1998 | Anderson | .................... | 359/110 |
| 6,008,916 A | 12/1999 | Khaleghi | .................... | 359/110 |
| 6,108,113 A | 8/2000 | Fee | ............................ | 359/124 |
| 6,115,157 A | 9/2000 | Barnard et al. | ................ | 398/1 |
| 6,141,125 A * | 10/2000 | Blair et al. | .................... | 398/32 |
| 6,240,222 B1 * | 5/2001 | Bergmann | .................... | 385/24 |
| 6,249,510 B1 * | 6/2001 | Thompson | .................... | 370/223 |
| 6,356,367 B1 * | 3/2002 | DeCusatis et al. | ............. | 398/5 |
| 6,452,701 B1 | 9/2002 | Terahara et al. | ............ | 359/110 |
| 6,504,630 B1 | 1/2003 | Czarnocha et al. | ......... | 359/110 |

* cited by examiner

*Primary Examiner*—Christina Y. Leung
(74) *Attorney, Agent, or Firm*—Fitzpatrick, Cella, Harper & Scinto

(57) ABSTRACT

A way of testing a wavelength division multiplexed (WDM) system without requiring connection to data source/sink equipment. A test signal is introduced onto a light path of interest in the system, and the test signal is monitored downstream for signal integrity. Lack of signal integrity is used to identify a fault in the lightpath. Alternatively, optical loopbacks may be used to localize and identify a fault in the lightpath. The lightpath includes a source optical node connected to a sink optical node via intermediate optical nodes. An optical signal introduced at the source node with a destination at the sink node may be looped back at any one of the intermediate nodes or the sink node to localize and identify a fault in the lightpath.

16 Claims, 8 Drawing Sheets

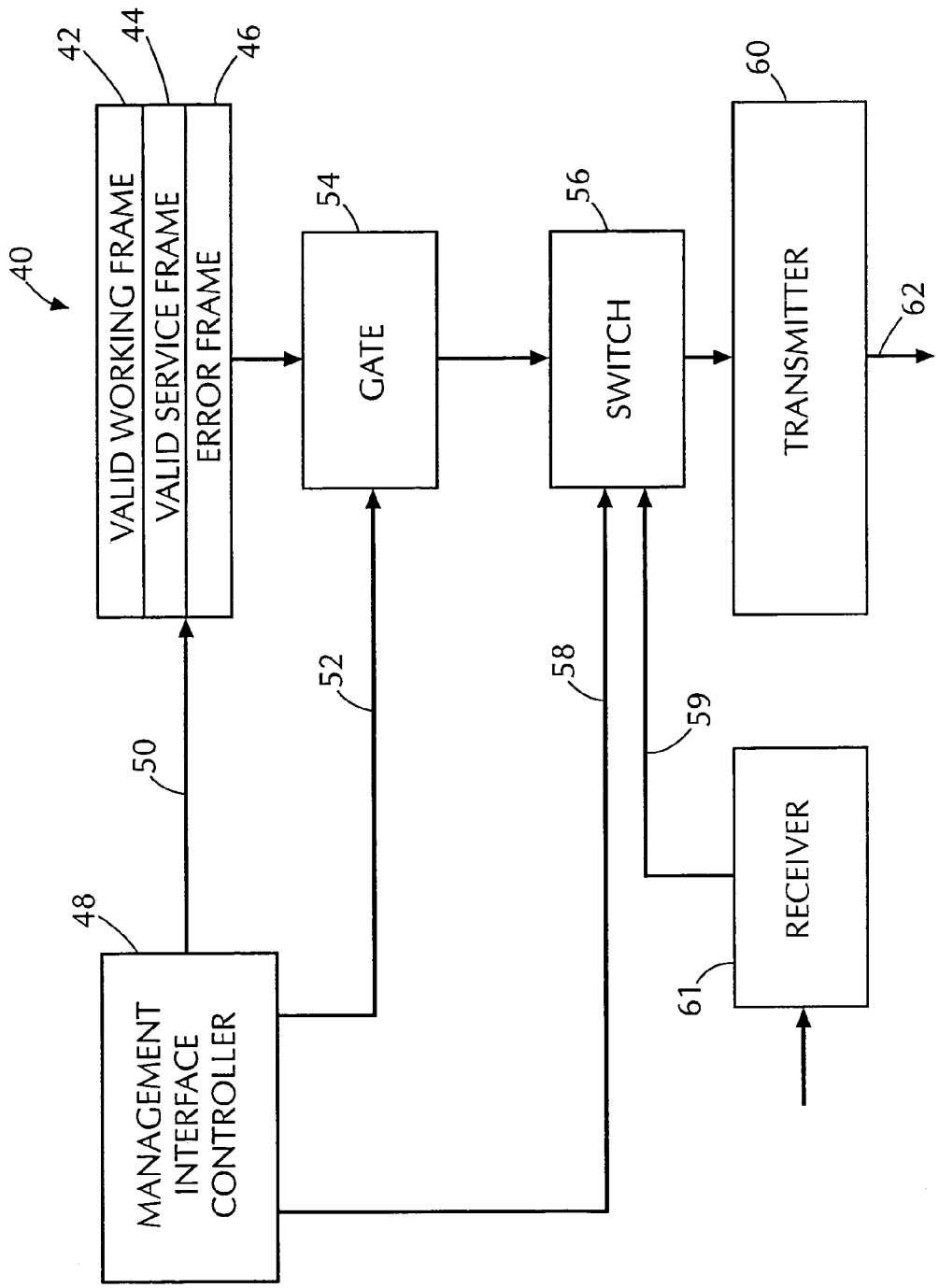

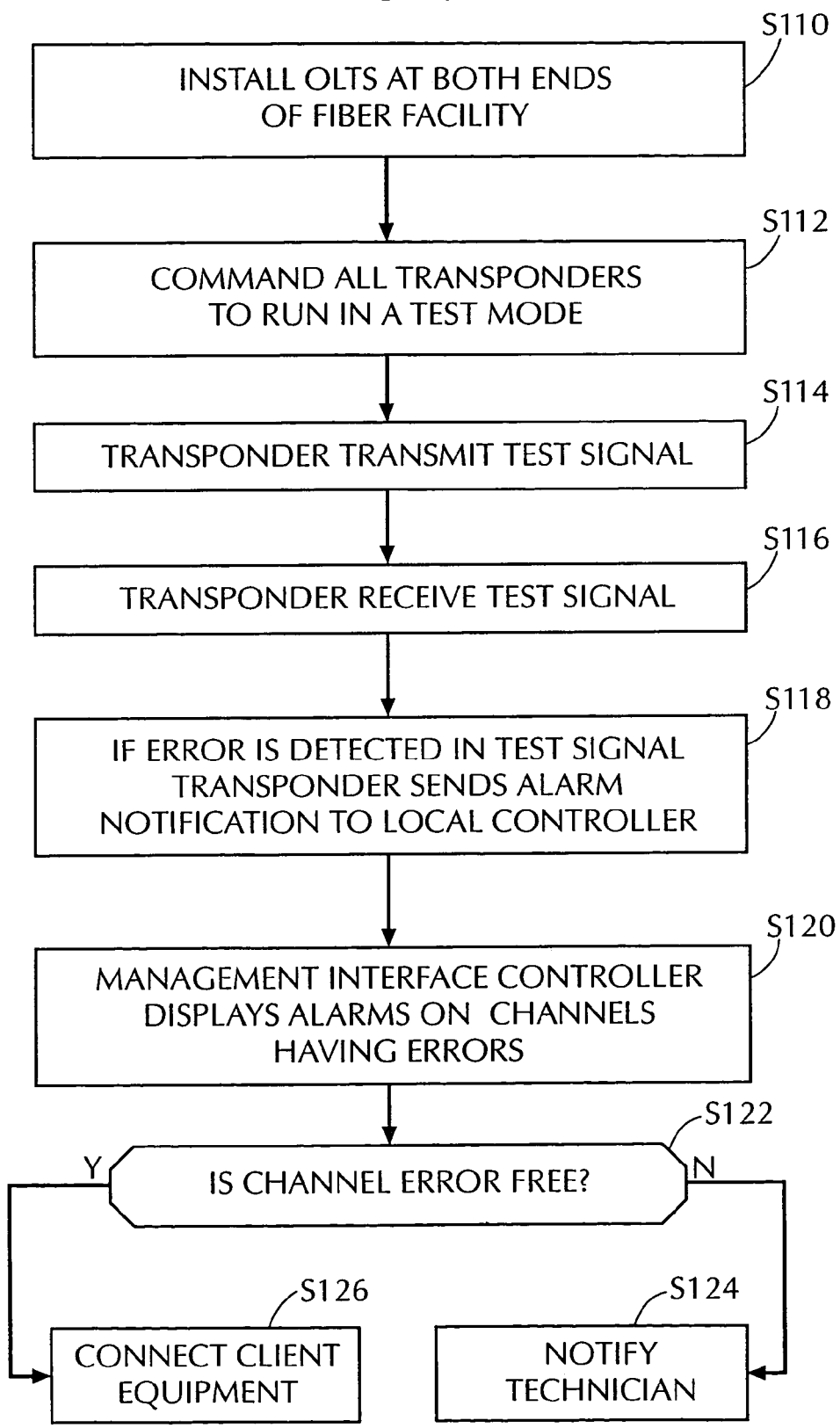

OPTICAL NETWORK CONNECTION TEST APPARATUS AND METHODS

CROSS-REFERENCE TO RELATED APPLICATIONS

This application is a division of application Ser. No. 09/332,046, filed Jun. 14, 1999, which claims the benefit of U.S. Provisional Application No. 60/112,506, filed Dec. 14, 1998.

FIELD OF THE INVENTION

The invention is in the field of optical telecommunications, and more particularly, pertains to detecting, isolating and localizing network transmission faults in a wavelength division multiplex (WDM) system.

BACKGROUND OF THE INVENTION

Wavelength division multiplexing is an approach for increasing the capacity of existing fiber optic networks. A WDM system employs plural optical signal channels, each channel being assigned a particular channel wavelength. In a WDM system optical signal channels are generated, multiplexed to form an optical signal comprised of the individual optical signal channels, transmitted over a single waveguide, and demultiplexed such that each channel wavelength is individually routed to a designated receiver.

A problem with many WDM systems is that they are not easily tested to determine optical transmission faults without first being connected to external data source/sink equipment such as client equipment. However, such connection makes it difficult to identify and localize transmission faults as being in the WDM system or the client equipment.

SUMMARY OF THE INVENTION

In view of the above, it is an aspect of the invention to test WDM systems without requiring connection to client equipment.

In another aspect of the invention a test signal is introduced in a lightpath of interest in WDM equipment, and the test signal is monitored downstream for system integrity. Detected lack of signal integrity is used to identify a fault in the lightpath of interest.

In a further aspect of the invention optical loopbacks are used in the WDM system to localize and identify faults in a lightpath. The lightpath originates at a source optical node connected to a sink optical node via intermediate optical nodes. The loopback is made at the sink node or at any intermediate node, without requiring conversion of the optical signal to an electrical signal.

These and other aspects and advantages of the invention will be apparent to those skilled in the art from the following detailed description.

BRIEF DESCRIPTION OF THE DRAWINGS

FIG. 2 is a block diagram of the test pattern injection circuit of FIG. 1;

FIG. 5 is a flow chart of a self test method according to the invention;

DETAILED DESCRIPTION

Figure 1:
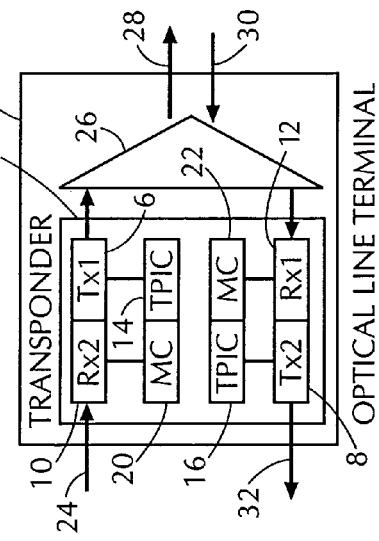
FIG. 1 is a schematic of a WDM optical line terminal according to the invention.

FIG. 1 is a schematic diagram of an optical node such as an optical line terminal (OLT) 2 which is used in a WDM system. WDM systems typically interface between a client equipment and an optical network through a transponder, which either converts a signal received from attached client equipment at a non-compatible wavelength into a wavelength that is suitable for use within the network, or converts a signal received from the network at a non-compatible wavelength into a wavelength that is suitable for use by attached client equipment.

OLT 2 includes a transponder 4 which has transmitters 6 and 8 and receivers 10 and 12. Test pattern injection circuits (TPIC) 14 and 16 cooperate with transmitters 6 and 8, respectively, and monitoring circuits (MC) 20 and 22 cooperate with receivers 10 and 12, respectively. A client equipment (not shown) provides a wavelength on line 24 to the receiver 10 with the wavelength then being transmitted by the transmitter 6 to a multiplexer/demultiplexer 26 which multiplexes the wavelength with other received wavelengths (not shown) and transmits the multiplexed wavelengths on a line 28 to a network (not shown). Multiplexed wavelengths received from the network on line 30 are demultiplexed by the multiplexer/demultiplexer 26 and a wavelength is provided to the receiver 12 and then to the transmitter 8 for transmission to the client equipment via the line 32.

The testing of the OLT 2 and associated equipment is accomplished through use of the TPIC and MC associated with the respective transmitters and receivers. A test pattern from a TPIC is introduced into the transmitted signal at a transmitter, such as a line Alarm Indication Signal (AIS) test pattern that is implemented using overhead bytes of a transmitted SONET based signal. The MC circuit monitors received wavelengths using a bit error rate (BER) method, that is adapted to monitor the received test pattern to provide the self-testing that is an aspect of the present invention. This is described in more detail below.

FIG. 2 illustrates a TPIC in the transponder 4, such as the TPICs 14 and 16 of FIG. 1. A frame memory 40 stores a valid working frame 42, a valid service frame 44 and an error frame 46. Any one of these frames may be used as the test pattern (signal). A management interface controller 48 sends a select signal on a line 50 to the frame storage memory 40 to select one of the frames to be used as a test pattern. If the error frame 46 is selected, errors are introduced which are subsequently detected by a MC at the destination transponder. The selected frame is provided to a gate 54 which is enabled to pass the selected frame to a switch 56 in response to a command signal on line 52 from the management interface controller 48. The switch 56 passes the selected frame to a transmitter 60 in response to a read data signal on a line 58 from the management interface controller 48. During normal operation, the switch 56 is configured to pass a signal on line 59 from the receiver 61 to the transmitter 60. The transmitter 60 transmits the selected frame on a line 62 to a multiplexer/demultiplexer (not shown) and to the network for provision to a connected WDM equipment.

Figure 3:
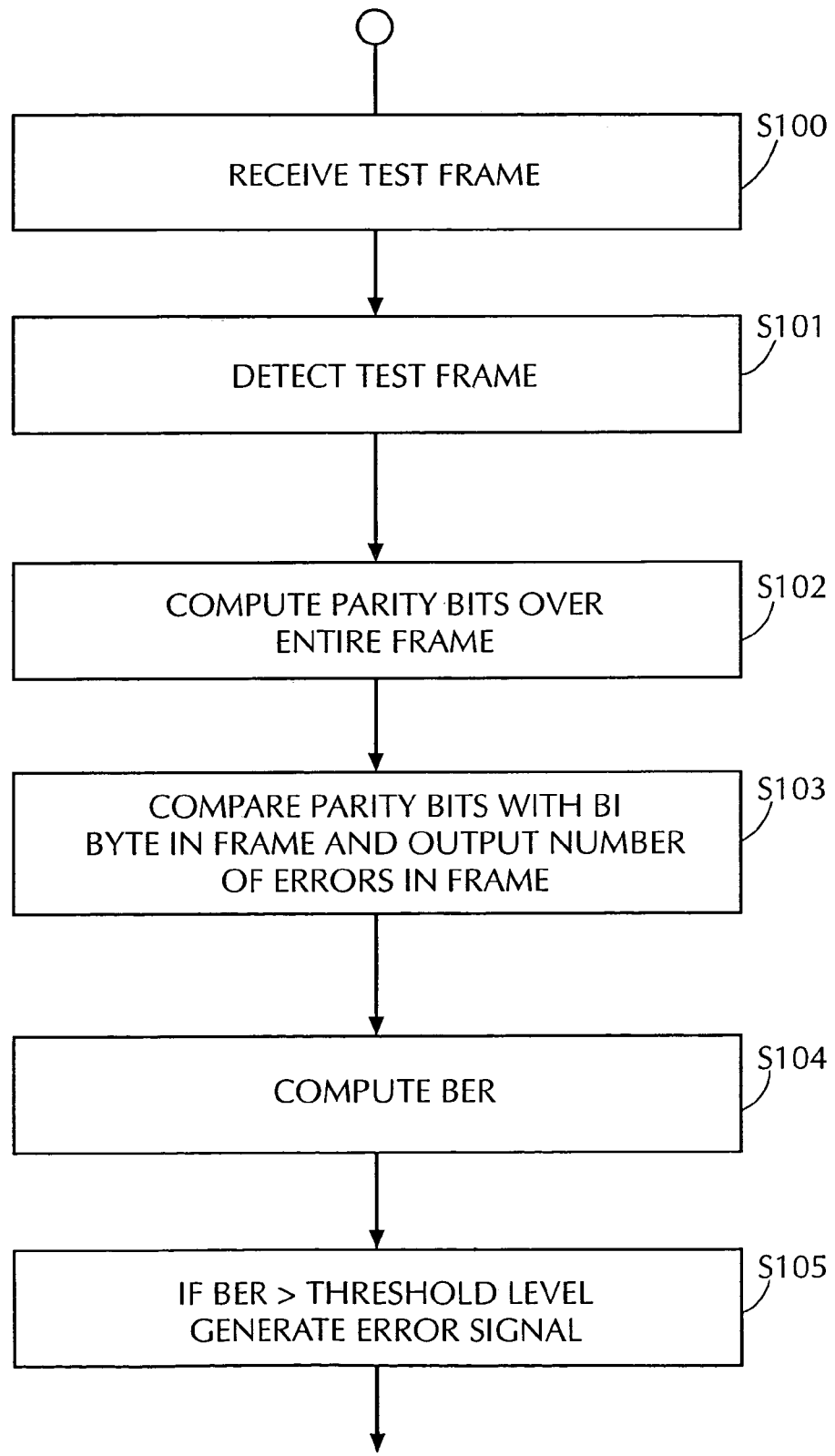
FIG. 3 is a flow chart showing the operation of the Monitoring Circuit of FIG. 1.

FIG. 3 is a flow chart illustrating the method of operation of a MC such as the MCs 20 and 22 in the transponder 4 of the OLT 2 of FIG. 1. At step S100 a receiver in the transponder receives a signal from the multiplexer/demultiplexer, and the test pattern (selected frame) is detected in step S101. At step S102 parity bits are computed over the entire frame, and at step S103 the parity bits are compared with the B1 BYTE in the frame, with the number of errors in the frame being output. The B1 BYTE is the result of a computation of a predetermined number of bytes in the frame, as is known in the art. At step S104 the bit error rate (BER) is computed based on the number of errors in the frame. If the BER is greater than a threshold level, an error signal is provided to the management interface controller 48 at step S105.

Figure 4:
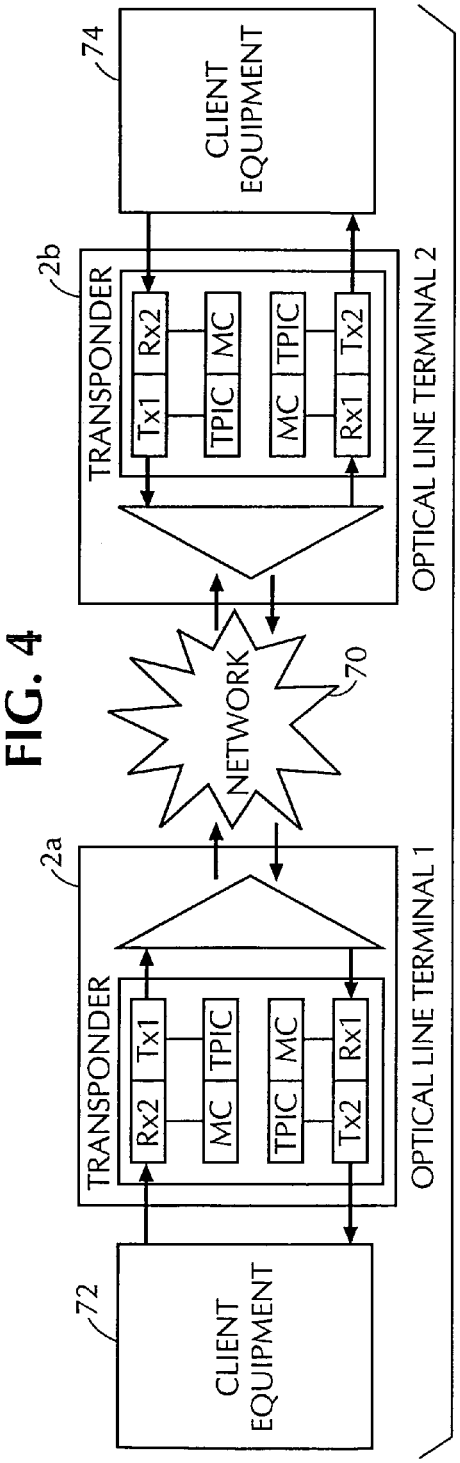
FIG. 4 illustrates two WDM optical line terminals of the type illustrated in FIG. 1 connected to an optical network.

FIG. 4 illustrates two WDM OLTs 2*a* and 2*b* of the type illustrated in FIG. 1 connected to an optical network 70. OLT 2*a* is, for example, disposed at one point on the network, while OLT 2*b* is disposed at another point on the network. Apparatus and methods of the present invention may be used to test a lightpath or communication link, of interest that extends across the network between OLT 2*a* and OLT 2*b*, without resort to any associated client equipment as previously required in the art. In practice, prior to OLT 2*a* being connected to client equipment 72 and OLT 2*b* being connected to client equipment 74, a lightpath extending between OLT 2*a* and OLT 2*b* may be tested through, for example, the combined use of the TPIC associated with OLT 2*a* and the MC associated with OLT 2*b*. On the transmit side at OLT 2*a*, the test pattern is injected into the transmitted signal and thus traverses the lightpath through network 70 to OLT 2*b*. The presence of the TPIC within the WDM system enables a transmitting WDM transponder to directly introduce such a test signal into the network. On the destination or receive side of the network at OLT 2*b*, the received signal is monitored for the transmitted test pattern, preferably through the transponder's MC. The MC, as described relative to FIG. 3, monitors the SONET B1 byte that enables a check of data parity. Signal monitoring is thus used to ensure that the tested connection yields a received signal of sufficient quality and integrity.

The test feature of the present invention is used at the time a connection is set up, for example, to verify the quality of the connection before additional equipment, such as client equipment, is attached. The present invention is particularly useful in attempting to determine whether a given fault condition is located within the associated network or external to a network. The testing feature may be used in combination with signal loopbacks along the lightpath to perform diagnostics on portions of the connections, whereby the transmitted signal having an injected test pattern therein is loopbacked by downstream equipment such that the transmitted signal may be received and monitored by the transmitting WDM system. Selection of the equipment that performs the signal loopback determines which portion of the connection is tested in this manner.

FIG. 5 is a flowchart of the method used for self-test. At step S110 OLTs, such as OLTs 2*a* and 2*b* of FIG. 4, are installed at both ends of a fiber facility (network), and at step S112 all transponders in the OLTs are commanded to run in a test mode. At step S114 the transponders are turned on and start transmitting a test signal, and at step S116 transponders receive the test signal from the source. At step S118 a determination is made if there are errors in the received test signal, and if so an alarm notification is sent to the local management system controller. At step S120 the management system controller displays alarms for channels which exhibit an error. At step S122 a determination is made on a per channel basis as to whether or not an error exists. If an error exists at step S124 a status signal is generated which is indicative that a technician should be instructed to repair the inoperative channel. On the other hand, if a channel is operating correctly, client equipment is then connected as indicated at step S126.

Figure 6:
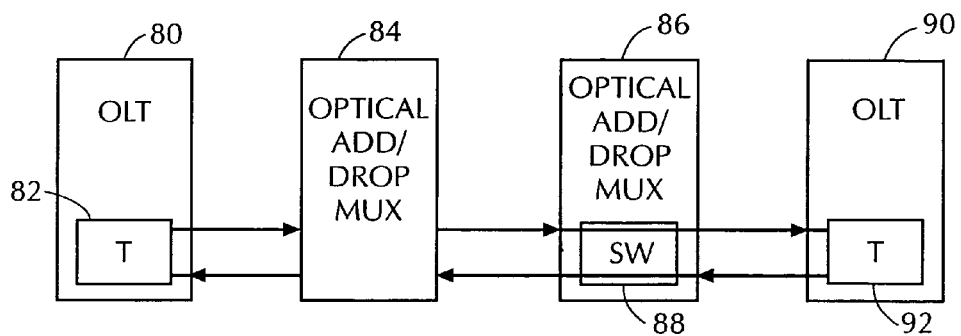
FIG. 6 illustrates a point-to-point WDM optical network configuration without loopback.
Figure 7:
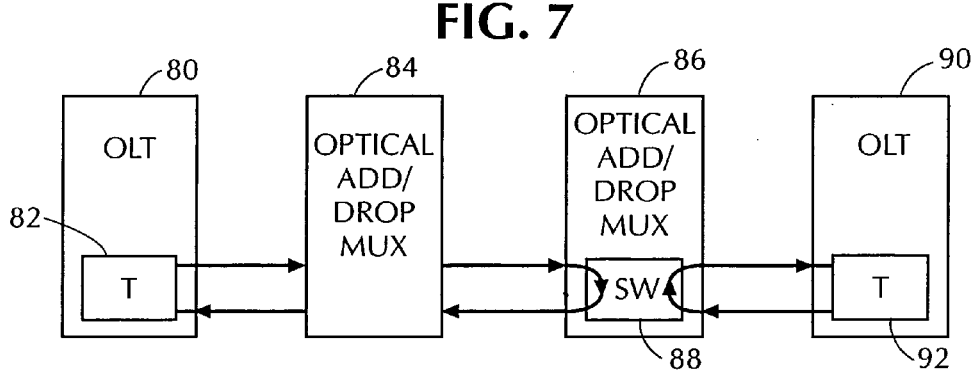
FIG. 7 illustrates the optical network configuration of FIG. 6 with loopback.

Another aspect of the present invention relates to WDM apparatus and methods that provide loopback functionality for optical network testing. FIGS. 6 and 7 illustrate an example of a point-to-point WDM network configuration that includes a plurality of optical nodes such as an OLT 80, including a transponder 82, an optical add/drop multiplexer 84, an optical add/drop multiplexer 86, including a loopback switch 88, and OLT 90 including a transponder 92. The loopback switch 88 in optical add/drop multiplexer 86 when in a normal mode allows westbound (right-to-left) traffic to flow through the device in a westbound direction, and similarly allows eastbound (left-to-right) traffic to flow through the device in an eastbound direction. However, when placed in a loopback mode as in FIG. 7, the switch 88 is used to redirect received traffic towards, for example, signal monitoring equipment within or proximate to the transmitting equipment. FIG. 7 illustrates such a loopback for eastbound traffic. In this way, that portion of the connection between OLT 80 and OLT 90 that extends between OLT 80 and optical add/drop multiplexer 86 can be tested for signal integrity and quality, thus facilitating isolation and localization of network faults. It is to be appreciated that a loopback switch may also be included in OLT 80, optical add/drop multiplexer 84 and OLT 90 to further isolate where a problem exists in the network. The loopback of the signal is accomplished without converting the optical signal to electrical form.

FIGS. 8(*a*) and 8(*b*) illustrate, on a per channel and per node basis, a preferred optical loopback arrangement for a WDM system that is based on an optical 2×2 switch. FIG. 8(*a*) depicts the switch in a non-loopback mode wherein traffic is not redirected for testing purposes, as in FIG. 6. FIG. 8(*b*), on the other hand, depicts the switch in a loopback mode, where both eastbound and westbound traffic are looped back for testing purposes as in FIG. 7.

Figure 8A:
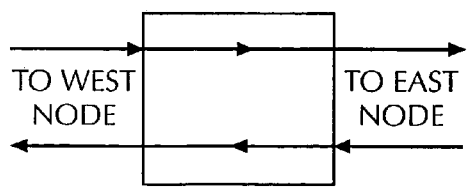
FIG. 8(a) illustrates an optical 2×2 switch in a non-loopback mode.
Figure 8B:
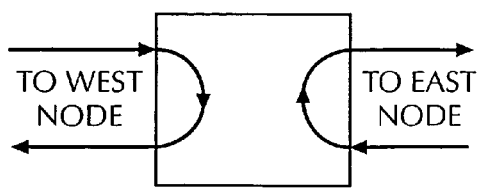
FIG. 8(b) illustrates an optical 2×2 switch in a loopback mode.
Figure 9:
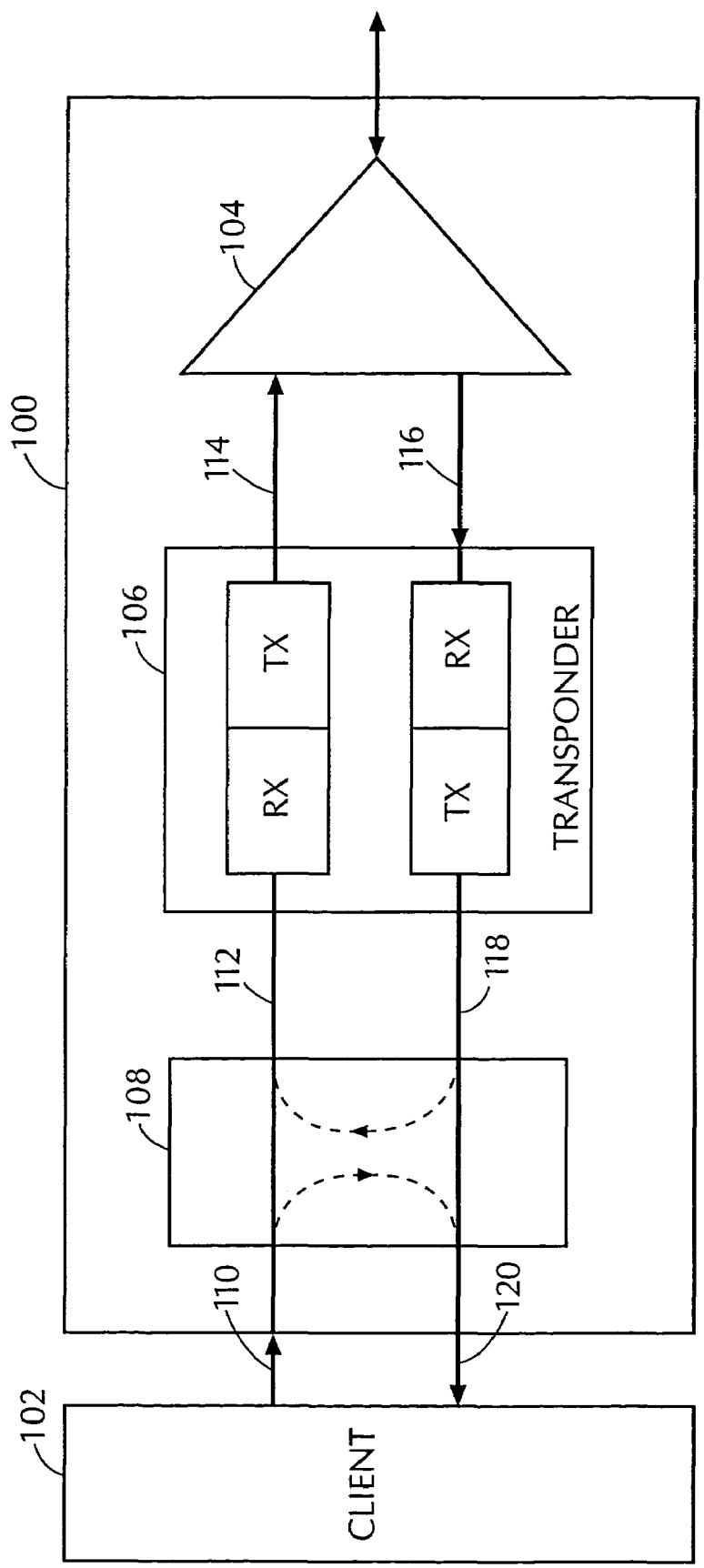
FIG. 9 is a block diagram illustrating loopback at a transponder using a 2×2 optical switch.

FIG. 9 is a block diagram illustrating loopback at a transponder using a 2×2 switch. An OLT 100 is connected to a client equipment 102. The OLT 100 includes a multiplexer/demultiplexer 104, transponder 106 and a 2×2 optical switch 108. When in a normal mode of operation, the switch 108 is as shown in FIG. 8(*a*) and a wavelength from client equipment 102 on line 110 passes through the switch to line 112 through the transponder 106 and via a line 114 to the multiplexer/demultiplexer 104 to be multiplexed with other wavelengths. A demultiplexed wavelength from the multiplexer/demultiplexer 104 is provided on a line 116 to the transponder 106 and then on line 118 to the switch 108 and via line 120 to the client equipment 102. When in the loopback mode of operation, the switch 108 is as shown in FIG. 8(b) and the wavelength on line 110 from client 102 is looped back through the switch 108 on the line 120 to client equipment 102. The output from the transponder on line 118 is looped back through the switch 108 to the line 112 to the transponder 106. In this way, a fault can be isolated between the client equipment 102 and the transponder 100. The loopback is accomplished without having to convert the optical wavelength to electrical form.

Figure 10:
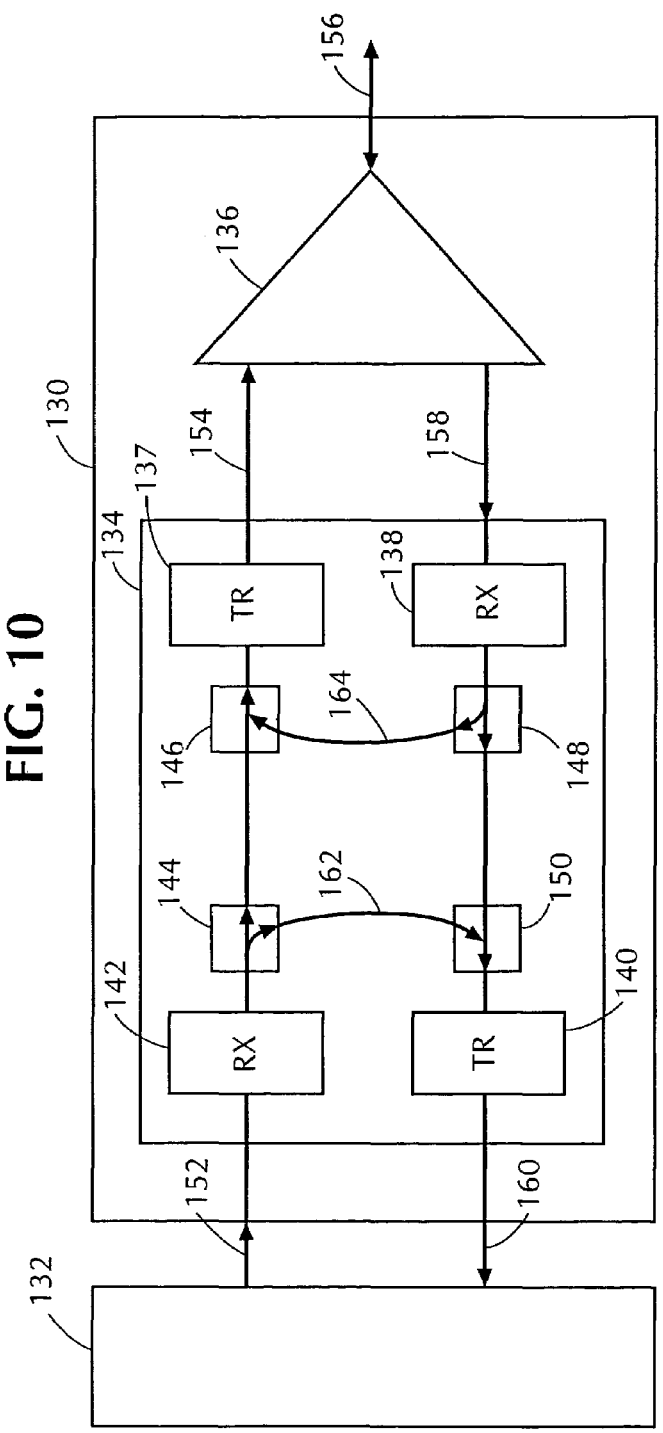
FIG. 10 is a block diagram illustrating loopback at a transponder using a different switch configuration.

FIG. 10 is a block diagram illustrating loopback at a transponder using a different switch configuration then is used in FIG. 9. An OLT 130 is connected to a client equipment 132. The OLT 130 includes a transponder 134 and a multiplexer/demultiplexer 136. The transponder 134 includes a transmitter 137, a receiver 138, a transmitter 140 and a receiver 142. The receiver 142 is connected to the transmitter 137 via a switch/bridge 144 and a selector 146. The receiver 138 is connected to the transmitter 140 via a switch/bridge 148 and a selector 150. In a normal mode of operation, a wavelength on line 152 from client equipment 132 is provided to the receiver 142, through the switch/bridge 144, the selector 146, the transmitter 137 and via line 154 to the multiplexer/demultiplexer 136 to be multiplexed with other wavelenghts and output on line 156 to other WDM equipment. In the reverse direction, during the normal mode of operation a demultiplexed wavelength on line 158 is provided to the receiver 138, the switch/bridge 148, the selector 150, the transmitter 140 and via line 160 to the client equipment 132. In a loopback mode, the signal on line 152 from client equipment 132 passes through the receiver 142, the bridge 144 to selector 150 via the path 162 through the transmitter 140 and back to client equipment 132 via line 160. In the other direction, the wavelength on line 158 is applied via the receiver 138 to the switch/bridge 148 to the selector 146 via the path 164 and to the transmitter 137 and the line 154 to the multiplexer/demultiplexer 136. In this way, a fault can be isolated between the client equipment 132 and the OLT 130.

Figure 11C:
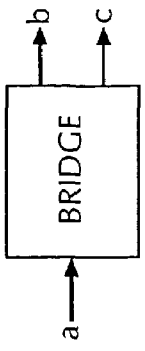
FIG. 11(c) illustrates a bridge which may be used in FIG. 10.

The switch/bridge and selector elements shown in FIG. 10 are electrical elements and they are detailed below. FIG. 11(a) illustrates a selector in which an input a or b is selected and is output on a line c. This corresponds to the elements 146 and 150 in FIG. 10.

Figure 11B:
FIG. 11(b) illustrates a switch which may be used in FIG. 10.
Figure 11A:
FIG. 11(a) illustrates a selector which may be used in FIG. 10.

FIG. 11(b) illustrates a switch in which an input a is output on line b or c. The switch may be used as the elements 144 and 148 in FIG. 10.

FIG. 11(c) illustrates a bridge in which a signal a is output at both points b and c. The bridge may also be used as the elements 144 and 148 in FIG. 10.

Figure 12:
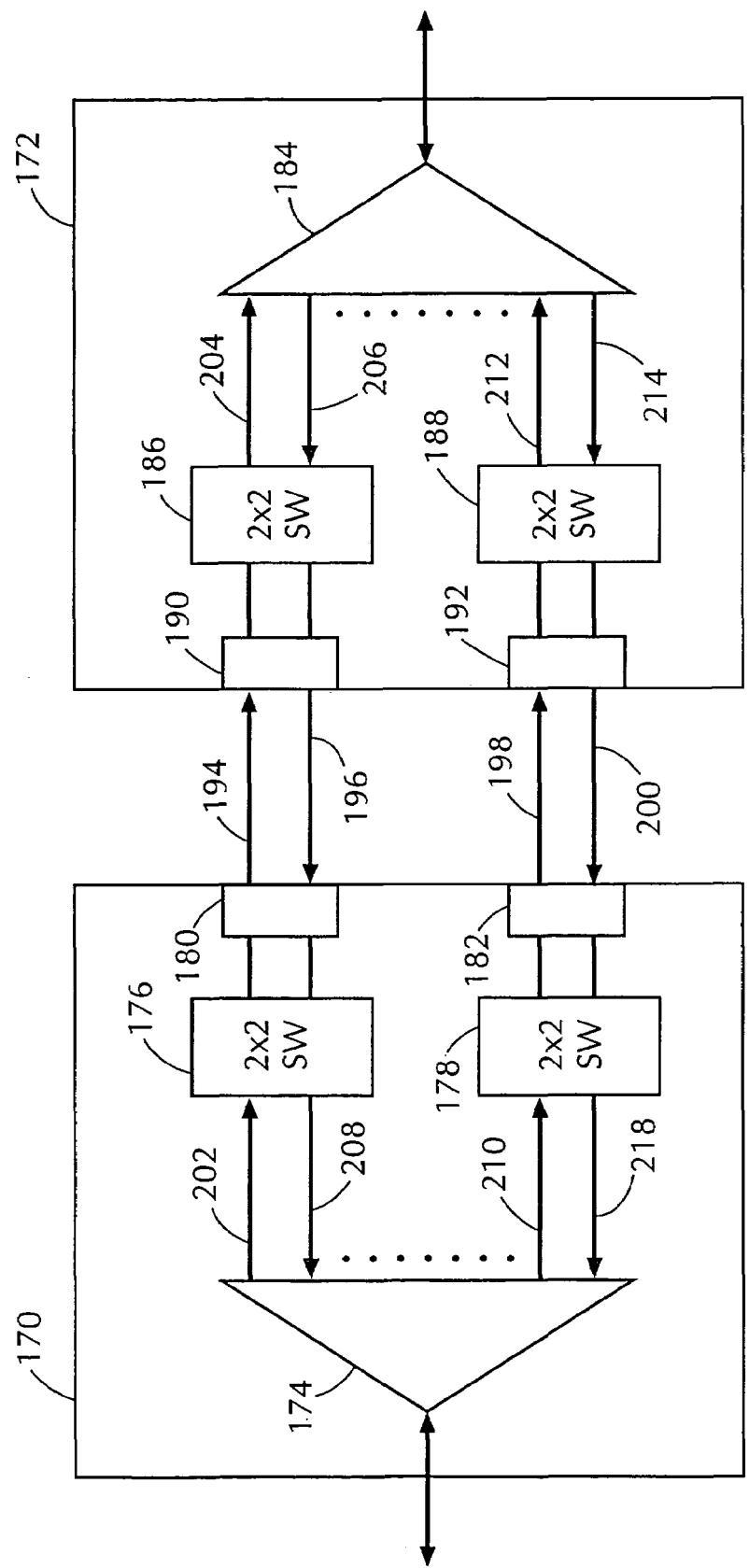
FIG. 12 illustrates two optical line terminals connected back-to-back with a loopback feature.

FIG. 12 illustrates 2 OLT terminals 170 and 172 connected back-to-back with a loopback feature. The OLT 170 includes a multiplexer/demultiplexer 174, 2×2 optical switches 176 and 178 and pass-through optical ports 180 and 182. Optical line terminal 172 includes a multiplexer/demultiplexer 184, 2×2 optical switches 186 and 188, and optical pass-through ports 190 and 192. Optical pass-through ports 180 and 190 are connected via optical fibers 194 and 196, and optical pass-through ports 182 and 192 are connected via optical fibers 198 and 200.

In a normal mode of operation a first demultiplexed wavelength on line 202 from the multiplexer/demultiplexer 174 of OLT 170 passes through the switch 176, the pass-through port 180 via line 194 to pass-through port 190 through switch 186 and via line 204 to multiplexer/demultiplexer 184. Likewise in the normal mode of operation the nth demultiplexed wavelength on line 210 from multiplexer/demultiplexer 174 passes through switch 178, pass-through port 182 via line 198 to pass-through port 192 of OLT 172 through switch 188 and via line 212 to multiplexer/demultiplexer 184. In a loopback mode in OLT 170, the wavelength on line 202 is loopbacked through switch 176 and line 208 to the multiplexer 174, and the wavelength on line 196 from OLT 172 is loopbacked through switch 176 via line 194 to the OLT 172. Likewise the nth wavelength on line 210 from multiplexer/demultiplexer 174 is separately loopbacked through the switch 178 via the line 218 to the multiplexer/demultiplexer 174, and the nth wavelength on line 200 is loopbacked through switch 178 to line 198 to the OLT 172. In this manner, faults can be isolated between the OLTs 170 and 172, without requiring conversion of the optical wavelength to electrical form.

In summary a method and apparatus has been disclosed for testing a WDM system without requiring connection to client equipment.

Although certain embodiments of the invention have been described and illustrated herein, it will be readily apparent to those of ordinary skill in the art that a number of modifications and substitutions can be made to the preferred example methods and apparatus disclosed and described herein without departing from the true spirit and scope of the invention.

What is claimed is:

1. An optical node comprising:
a first optical line terminal having an all-optical-pass-through port side interface including a plurality of port side transmit ports, each to transmit a respective one of a plurality of optical wavelengths, and a plurality of associated port side receive ports, to receive respective ones of the plurality of optical wavelengths, the first optical line terminal including at least one transponder connected to a predetermined one of the transmit ports and also connected to an associated one of the port side receive ports, the at least one transponder including a loopback mechanism to perform looping back of an optical wavelength received at the associated one of the port side receive ports to the predetermined one of the port side transmit ports;
a second optical line terminal having an all-optical-pass-through port side interface including a plurality of port side transmit ports, each to transmit a respective one of the plurality of optical wavelengths, and a plurality of associated port side receive ports, to receive respective ones of the plurality of optical wavelengths, the second optical line terminal including at least one transponder connected to a predetermined one of the port side transmit ports and also connected to an associated one of the port side receive ports, the at least one transponder including a loopback mechanism to perform looping back of an optical wavelength received at the associated one of the port side receive ports to the predetermined one of the port side transmit ports; and
an optical connection, optically connecting at least one of the port side transmit ports of the first optical line terminal to at least one of the port side receive ports of the second optical line terminal, and connecting at least one port side receive port of the first optical line terminal to at least one transmit port of the second optical line terminal.

2. The optical node of claim 1, wherein the loopback mechanism comprises a 2×2 optical switch.

3. The optical node of claim 1, wherein the optical wavelength looped back by the loopback mechanism is a test optical signal.

4. The optical node of claim 1, wherein the first and second optical line terminals each include a further transponder including a further loopback mechanism formed of a 2×2 optical switch.

5. The optical node of claim 1, wherein the optical connection is a wavelength division multiplex connection system.

6. An optical line terminal comprising:
an interface having a receive port to receive an optical signal, including a test optical signal, that originated from an originating optical node and also having a transmit port to transmit the optical signal, including the test optical signal, back to the originating node;
at least one further communication interface;
at least one transponder coupled between the interface and the at least one further communication interface, the at least one transponder being coupled to the at least one further communication interface through at least one communication terminal of the at least one transponder, the at least one transponder also having a transmit output terminal and a receive input terminal;
at least one optical switch having four terminals, with a first terminal connected to the receive port and a second terminal connected to the transmit port of the interface, and a third terminal connected to the receive input terminal and a fourth terminal connected to the transmit output terminal of the at least one transponder, the at least one optical switch having a normal state in which a first optical path is provided from the first terminal to the third terminal of the at least one optical switch to provide an optical connection from the receive port of the interface to the receive input terminal of the at least one transponder, and a second optical path is provided from the second terminal to the fourth terminal of the at least one optical switch to provide an optical connection from the transmit output terminal of the at least one transponder to the transmit port of the interface, the at least one optical switch having a loopback state in which a third optical path is provided from the first terminal to the second terminal of the at least one optical switch to loopback the optical signal including the test optical signal received at the receive port to the transmit port of the interface, and a fourth optical path is provided from the third terminal to the fourth terminal of the at least one optical switch to loopback the optical signal including the test optical signal transmitted from the transmit output terminal to the receive input terminal of the at least one transponder, wherein while in the loopback state, the at least one optical switch does not convert the optical signal, including the test optical signal, to electrical form; and
at least one multiplexer/demultiplexer optically coupled between the at least one communication terminal of the at least one transponder and the at least one further communication interface.

7. An optical line terminal comprising:
an interface having a receive port to receive optical signals, and a transmit port to transmit optical signals;
at least one line side communication interface;
at least one transponder coupled between the interface and the at least one line side communication interface, the at least one transponder being coupled to the at least one line side communication interface through at least one communication terminal of the at least one transponder, the at least one transponder also having a transmit output terminal and a receive input terminal;
at least one optical switch to either perform at least one of looping back an optical signal received at the receive port to the transmit port of the interface, and looping back an optical signal transmitted from the transmit output terminal to the receive input terminal of the at least one transponder, or perform forwarding of at least one optical signal between the interface and the at least one line side communication interface through the at least one transponder, the optical switch having first and second switch terminals connected to the transmit port and receive port, respectively, of the interface, and having third and fourth switch terminals connected to the transmit output terminal and the receive input terminal, respectively, of the at least one transponder, wherein when performing looping back, the optical switch does not convert the optical signal to electrical form; and
at least one multiplexer/demultiplexer optically coupled between the at least one communication terminal of the at least one transponder and the at least one line side communication interface.

8. The optical line terminal of claim 7, wherein each optical signal looped back by the at least one optical switch is a test optical signal.

9. An optical line terminal, comprising:
a line interface having a line side transmit port to transmit an optical signal and a line side receive port to receive an optical signal;
a port side interface having a port side transmit port to transmit an optical signal and a port side receive port to receive an optical signal;
and a transponder connected to the line side transmit port and the line side receive port of the line side interface, and also connected to the port side transmit port and port side receive port of the port side interface, the transponder including a loopback mechanism to perform at least one of looping back of the received optical signal at the line side receive port to the line side transmit port and looping back of the received optical signal at the port side receive port to the port side transmit port,
wherein the loopback mechanism comprises:
a first switch connected to switch the received optical signal at the line side receive port between a first path leading to the port side transmit port and a second path leading to the line side transmit port;
a second switch connected to select between the second path and a third path leading from the port side receive port and to provide an output leading to the line side transmit port;
a third switch connected to select between the first path and a fourth path leading from the port side receive port and to provide an output leading to the port side transmit port; and
a fourth switch connected to switch the received optical signal at the port side receive port between the third path leading to the line side transmit port and the fourth path leading to the port side transmit port.

10. The optical line terminal of claim 9, wherein the first and fourth switches are switch/bridges and the second and third switches are selectors.

11. The optical line terminal of claim 9, wherein the received optical signal at the line side receive port and looped back by the loopback mechanism to the line side transmit port is a test optical signal.

12. The optical line terminal of claim 9, further comprising a multiplexer/demultiplexer between the line side interface and the transponder.

13. An optical line terminal, comprising:
a line interface having a line side transmit port to transmit an optical signal and a line side receive port to receive an optical signal;
a port side interface having a port side transmit port to transmit an optical signal and a port side receive port to receive an optical signal;
a transponder connected to the line side transmit port and the line side receive port of the line side interface, and also connected to the port side transmit port and port side receive port of the port side interface, the transponder including a loopback mechanism to perform one of looping back the received optical signal at the line side receive port to the line side transmit port and looping back the received optical signal at the port side receive port to the port side transmit port; and
a multiplexer/demultiplexer connected between the transponder and the line side transmit and receive ports.

14. The optical line terminal of claim 13, wherein the loopback mechanism comprises a 2×2 optical switch.

15. The optical line terminal of claim 13, wherein the received optical signal at the line side receive port and looped back by the loopback mechanism to the line side transmit port is a test optical signal.

16. The optical line terminal of claim 13, wherein the optical line terminal is connected to an external equipment via the port side interface.

* * * * *

UNITED STATES PATENT AND TRADEMARK OFFICE
CERTIFICATE OF CORRECTION

| | | |
|---|---|---|
| PATENT NO. | : 7,110,668 B2 | Page 1 of 1 |
| APPLICATION NO. | : 10/784972 | |
| DATED | : September 19, 2006 | |
| INVENTOR(S) | : Ornan A. Gerstel et al. | |

It is certified that error appears in the above-identified patent and that said Letters Patent is hereby corrected as shown below:

<u>COLUMN 2</u>:

Line 6, "loopback.  FIG. 8(a)" should read --loopback.  ¶ FIG. 8(a)--.

<u>COLUMN 8</u>:

Line 33, claim 9 "signal;" should read --signal; and--; and
Line 34, claim 9 "and" should be deleted.

Signed and Sealed this

Thirteenth Day of May, 2008

JON W. DUDAS
*Director of the United States Patent and Trademark Office*